United States Patent [19]

Kanda et al.

[11] Patent Number: 4,530,946
[45] Date of Patent: Jul. 23, 1985

[54] RESINOUS EMULSION COMPRISING MICROPARTICLES FOR COATING USE AND PREPARATION THEREOF

[75] Inventors: Kazunori Kanda, Yao; Keizou Ishii, Ashiya; Katsuaki Kida, Osaka; Shinichi Ishikura, Kyoto; Ryuzo Mizuguchi, Yahata, all of Japan

[73] Assignee: Nippon Paint Co., Ltd., Osaka, Japan

[21] Appl. No.: 585,595

[22] Filed: Mar. 2, 1984

Related U.S. Application Data

[63] Continuation-in-part of Ser. No. 460,878, Jan. 25, 1983, Pat. No. 4,461,870.

[30] Foreign Application Priority Data

Jan. 27, 1982 [JP] Japan ................................. 57-13053
Jan. 27, 1982 [JP] Japan ................................. 57-13054

[51] Int. Cl.$^3$ .............................................. C08L 63/10
[52] U.S. Cl. .................................... 523/418; 523/421; 524/512; 524/513; 524/502; 524/522; 524/523; 524/811; 524/814; 524/816; 524/819
[58] Field of Search ............... 523/418, 421; 524/512, 524/513, 521, 522, 523, 502, 811, 814, 816, 819; 525/118, 162, 176, 212, 221

[56] References Cited

U.S. PATENT DOCUMENTS 4,368,287  1/1983  Ishikura et al. ..................... 524/513
4,427,820  1/1984  Backhouse et al. ................. 524/504

Primary Examiner—Theodore E. Pertilla
Attorney, Agent, or Firm—Wenderoth, Lind & Ponack

[57] ABSTRACT

A resinous emulsion is prepared by copolymerizing α,β-ethylenically unsaturated monomers and a crosslinking monomer which is at least difunctional, in an aqueous medium in the presence of a resin having an amphoionic group of the formula:

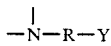

wherein R represents substituted or unsubstituted $C_1$-$C_6$ alkylene or phenylene and Y is —COOH or —SO$_3$H, or in the presence of a resin having the above said amphoionic group and a polymerizable α,β-unsaturated bonding. The thus obtained emulsion is useful for the obtainment of crosslinked polymer microparticles to be incorporated in a high solid coating composition or for the preparation of aqueous coating composition because of having contained no harmful emulsifier or surfactant.

3 Claims, No Drawings

RESINOUS EMULSION COMPRISING MICROPARTICLES FOR COATING USE AND PREPARATION THEREOF This is continuation-in-part of Ser. No. 460,878, filed Jan. 25, 1983 now U.S. Pat. No. 4,461,170, issued July 24, 1984.

FIELD OF INVENTION

The present invention relates to a resinous emulsion for coating use and preparation thereof.

BACKGROUND OF INVENTION

Recently, the areas of high solid coating compositions comprising crosslinked polymer microparticles dispersed in a conventional coating composition containing film-forming resinous vehicle, has been watched with keen interest for various coating applications, and especially in the automobile industry, because of the eminent workability and capability of producing a coating with excellent film performance. These particles are composed of a polymer crosslinked to the extent that it is insoluble in an organic solvent in which the particles are dispersed, finely pulverized to micron size, and stably dispersed in the coating composition. Dispersion of said microparticles in a solvent or a carrier vehicle is sometimes referred to, for convenience, "microgels".

In preparing such microgels, various methods have been proposed. One of the methods proposed comprises the combination of steps of preparing fine particles of polymer by emulsion polymerization technique from ethylenically unsaturated monomer and other crosslinkable, polymerizable monomer in an aqueous medium, and separating the thus formed microgel particles from the reaction system by solvent replacement, azeotropic distillation, centrifugal separation, filtering, drying and other means. Another one is the so-called NAD (non-aqueous dispersion) method comprising reacting monomer having an ethylenical unsaturation and other copolymerizable crosslinking monomer in a non-aqueous organic solvent which may dissolve monomers but not the formed polymer, and separating the thus formed polymer microparticles therefrom.

For industrial purposes, much preference is given to the former because the formation of fine particles and the removal of reaction heat can be easily preformed. However, in that method, one extra step is always required to remove water from the formed emulsion. Furthermore, since a comparatively low molecular weight compound, mainly of anionic or cationic surfactant, is customarily used as an emulsifier for assisting effective dispersion of monomers in an aqueous medium and this is always carried, by adhesion, onto the surfaces of polymer particles, the same is, when coated, necessarily contained in the coating, exerting harmful effects on the film performance with respect to water resistance and the like. In addition, in the formation of coating compositions, (a) volatile organic solvent(s) such as aromatic hydrocarbons, is (are) customarily used. Since the emulsifier used in the emulsion polymerization step for assistance in the dispersion of monomers in an aqueous medium is almost useless for the purpose of obtaining a stable dispersion of microparticles in a different environment i.e., an organic solvent, there is always required a special device to keep the microparticles in the stabilized dispersion state in such coating composition.

On the other hand, in the NAD method, use is made of a non-aqueous organic solvent which will scarcely dissolve the polymer in it. Therefore, the thus formed product may be directly added to the coating composition. Or even if the separation of microparticles is to be desired, it may be easily done by mere adoption of simple filtering means. However, this NAD method introduces various problems inherent thereto and differing from those of the emulsion polymerization method. First of all, this method requires a particular type of dispersion stabilizing agent in the copolymerization of ethylenically unsaturated monomer and crosslinkable, copolymerizable monomer in a non-aqueous organic medium to obtain microgels. Usually, said stabilizing agent is a graft copolymer comprising a polymer backbone which is non-solvatable by the organic liquid reaction medium, and a plurality of solvatable polymer chains pendant from the backbone. However, actual selection of said graft copolymer has to be made very carefully in due consideration of affinity for the polymer particles as well as affinity for the solvent, depending on the types of monomers and of the non-aqueous organic solvent used. Furthermore, since a low polarity liquid solvent mainly composed of aliphatic hydrocarbons is used as an organic liquid in the preparation of microgels and a relatively highly polar organic solvent is used in the formulation of coating composition, the dispersion stabilizing agent used in the microgel formation step is almost useless for the stabilization of microgels in the coating composition. As a solution to this problem, laid Open Japanese Patent Application Nos. 133234/78, 133235/78, 133236/78 and 150439/79 suggest that after formation of microgels, particular monomers capable of forming polymer having the same composition to that of the film-forming polymer used in the coating composition are polymerized on the surfaces of said microgel particles, thereby effecting modification of polymer surfaces so as to accomodate themselves to the different circumstances. Thus, there are various problems in heretofore known methods for the preparation of microgels and high solid coating compositions using the same and no satisfactory solutions have been found yet. Under the circumstances, it would be an immeasurable advancement of the technical level concerned if one could provide microgels accompanied by no harmful component and capable of admixing with a coating composition without the necessity of adopting any special aftertreatment or using a particular type of stabilizing agent and this would constitute the most economical and practical preparation method thereof.

SUMMARY OF INVENTION

An object of the present invention is, therefore, to provide a resinous emulsion, the dispersed phase being microparticles of polymer accompanied by no harmful component and capable of being admixed with a coating composition without the necessity of adopting any special aftertreatment or using a particular type of stabilizing agent. The other object of the invention is to provide a method for the preparation of such resinous emulsion without using any material detrimental to subsequent use in coating area. The other objects mill be apparent from the description of the specification and accompanying claims.

The invention, thus, provides a resinous emulsion comprising a dispersion medium of water and a dispersed phase of polymer microparticles having an average diameter of 0.02 to 0.5$\mu$ which are insoluble in water and are maintained in a stabilized state of dispersion therein, which is characterized in that the microparticles are composed of crosslinked polymer comprising α,β-ethylenically unsaturated monomers and a crosslinking monomer which is at least difunctional, said polymer having physically adhered or covalently bonded thereto a resinous portion having an amphoionic group of the formula:

wherein R is a member selected from substituted or unsubstituted alkylene having 1 to 6 carbon atoms and phenylene and Y is —COOH or —SO$_3$H, said resinous portion being selected from the group consisting of modified epoxy, acrylic, polyester and melamine resins. The polyester resins include alkyds.

There also is provided a method for the preparation of such resinous emulsion characterized by effecting copolymerization of α,β-ethylenically unsaturated monomers and crosslinking monomer in an aqueous medium, following the emulsion polymerization technique, in the presence of a resin having an amphoionic group of the formula:

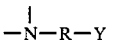

in which R and Y have the same meanings as defined above, or a resin having an amphoionic group of the formula:

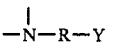

and a polymerizable α,β-unsaturated bondings, the resin being selected from alkyd, modified epoxy, acrylic, polyester or melamine resin.

Description of Specific Embodiments

Fine particles of crosslinked acrylic polymer may be advantageously prepared by the copolymerization of at least one α,β-ethylenically unsaturated monomer and at least one crosslinking monomer which is difunctional with respect to the polymerization reaction, in an aqueous medium. Such method is known to be quite useful for the obtainment of very fine particles of water insoluble polymer. As the α,β-ethylenically unsaturated monomers, use is, in general, made of the following:

(1) carboxyl bearing monomers as, for example, acrylic acid, methacrylic acid, crotonic acid, itaconic acid, maleic acid and fumaric acid, (2) hydroxy bearings monomers as, for example, 2-hydroxyethyl acrylate, hydroxy propyl acrylate, 2-hydroxyethyl methacrylate, hydroxypropyl methacrylate, hydroxybutyl acrylate, hydroxybutyl methacrylate, allyl alcohol and methallyl alcohol, (3) nitrogen containing alkyl acrylates or methacrylates as, for example, dimethylaminoethyl acrylate and dimethylaminoethyl methacrylate, (4) polymerizable amides as, for example, acrylic amide and methacrylic amide, (5) polymerizable nitriles as, for example, acarylonitrile and methacrylonitrile, (6) alkyl acrylates or methacrylates as, for example, methyl acrylate, methyl methacrylate, ethyl acrylate, n-butyl acrylate, n-butyl methacrylate and 2-ethylhexyl acrylate, (7) polymerizable aromatic compounds as, for example, styrene, α-methyl styrene, vinyl toluene and t-butyl styrene, (8) α-olefins as, for example, ethylene and propylene, (9) vinyl compounds as, for example, vinyl acetate and vinyl propionate, (10) diene compounds as, for example, butadiene and isoprene, and the like.

These monomers are used alone or in combination.

Crosslinking monomers may be any of the monomers of functionality greater than two. Preferable members are the so-called polyfunctional monomers having two or more ethylenical unsaturations in its molecule such as polymerizable unsaturated monocarboxylic esters of polyhydric alcohol, polymerizable unsaturated alcoholic esters of polycarboxylic acid and aromatic compounds substituted with more than 2 vinyl groups. Examples of such members are ethyleneglycol diacrylate, ethyleneglycol dimethacrylate, triethyleneglycol dimethacrylate, tetraethylene glycol dimethacrylate, 1,3-butyleneglycol dimethacrylate, trimethylolpropane triacrylate, trimethylolpropane trimethacrylate, 1,4-butanediol diacrylate, neopentylglycol diacrylate, 1,6-hexanediol diacrylate, pentaerythritol diacrylate, pentaerythritol triacrylate, pentaerythritol tetracrylate, pentaerythritol dimethacrylate, pentaerythritol trimethacrylate, pentaerythritol tetramethacrylate, glycerol diacrylate, glycerol dimethacrylate, glycerol allyloxy dimethacrylate, 1,1,1-tris-hydroxymethylethane triacrylate, 1,1,1-tris-hydroxymethylethane dimethacrylate, 1,1,1-tris-hydroxymethylethane trimethacrylate, 1,1,1-tris-hydroxymethylpropane diacrylate, 1,1,1-tris-hydroxymethylpropane triacrylate, 1,1,1-tris-hydroxymethylpropane dimethacrylate, 1,1,1-tris-hydroxymethylpropane trimethacrylate, triallyl cyanurate, triallyl isocyanurate, triallyl trimellitate, diallyl terephthalate, diallyl phthalate and divinyl benzene. Crosslinking monomers may also be of the combination of two ethylenically unsaturated monomers each bearing mutually reactive functional group as, for example, the combination of epoxy bearing ethylenically unsaturated monomers such as glycidyl acrylate and glycidyl methacrylate, and carboxyl bearing ethylenically unsaturated monomers such as acrylic acid, methacrylic acid and crotonic acid. Other examples of combination of mutually reactive functional groups are amine and carbonyl, epoxide and acid anhydride, amine and acid chloride, alkyleneimine and carbonyl, organoalkoxysilane and carboxyl, hydroxyl and isocyanate, and the like.

These α,β-ethylenically unsaturated monomers and crosslinking monomers are reacted in an aqueous medium in a conventional way to obtain microparticles of crosslinked copolymer. However, in the present invention, said polymerization must be carried out in the presence of a resin having an amphoionic group of the formula:

(in which R and Y are as defined above).

Examples of such resins are alkyd, polyester, modified epoxy, acrylic and melamine resins having the amphoionic group of the formula:

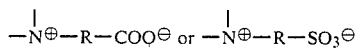

These resins can exhibit specific behaviors in regard to reactivity, surface activity, and electrochemical properties because of the presence of said amphoionic radical, and are very useful as an emulsifier or stabilizing agent in that polymerization reaction.

Alkyd resins and polyester resins are characterized by forming a series of ester chains using as essential components polycarboxylic acid and polyhydric alcohol. Therefore, when a part of said polyhydric alcohol is replaced by, for example, a compound of the formula:

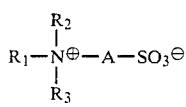
(I)

wherein $R_1$ represents an alkyl having at least one hydroxyl group, $R_2$ and $R_3$ are the same or different, each represents hydrogen or optionally substituted alkyl group, and A represents optionally substituted alkylene having 1 to 6 carbon atoms or phenylene group, it is possible to obtain alkyd or polyester resins having the above said amphoionic group in its molecule. Reference may be made in this connection to Japanese Patent Application of Nippon Paint Co., Ltd., Nos. 110865/79 and 56048/80 (Kokai Nos. 34725/81 and 51727/81), filed on Aug. 30, 1979 and Apr. 26, 1980, resectively. Among these resins, the members having an acid value of 30 to 150, and especially 700 to 3000 are preferably used in this invention.

Modified epoxy resins having the characteristic amphoionic group of the formula:

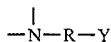

are stated, for example, in Japanese Patent Application of Nippon Paint Co., Ltd., No. 116293/80 filed on Aug. 22, 1980 (now laid open as Kokai No. 40522/82).

In general, the epoxy resin is characterized by having at the end of the polymer chain a group of the formula:

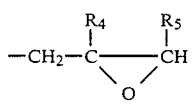
(II)

wherein $R_4$ and $R_5$ each represents hydrogen or methyl group.

Therefore, it is possible to obtain a modified epoxy resin having at the end of polymer chain a quantity of such radial as

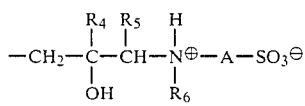
(IV)

by the reaction of said epoxy resin with a compound of the formula:

(III)

wherein $R_6$ is an alkyl group optionally substituted with a radical incapable of reacting with epoxy group, M stands for alkali metal or ammonium, and A has the same meaning as defined above. In proportion to the quantity of said amphoionic groups, the hydrophilic property of the modified epoxy resin will increase. Reference may be made in this connection to Japanese Patent Application of Nippon Paint Co., Ltd., No. 116293/80 filed on Aug. 22, 1980 (now laid open as Kokai No. 40522/82).

An acrylic resin having in its molecule a radial of the formula:

can be advantageously prepared by a solution polymerization using a free radical initiator from the combination of at least one polymerizable amino acid compound selected from

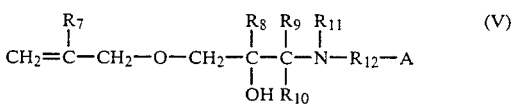
(V)

wherein $R_7$, $R_8$, $R_9$ and $R_{10}$ each represents a member selected from the group consisting of H, $CH_3$ and $C_2H_5$, $R_{11}$ is hydrogen or alkyl having 1 to 20 carbon atoms optionally including in its chain one of —SO—, —COO— and —O— groups, $R_{12}$ represents alkylene group having 1 to 12 carbon atoms, optionally substituted with —OH, —SH, —$SR_{13}$ (in which $R_{13}$ is alkyl having 1 to 4 carbon atoms) or one or more of alkyl having 1 to 4 carbon atoms, and A represents COOH or $SO_3H$ group;

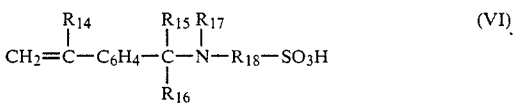
(VI)

wherein $R_{14}$, $R_{15}$ and $R_{16}$ each represents H or alkyl having 1 to 6 carbon atoms, $R_{17}$ represents hydrogen or alkyl having 1 to 20 carbon atoms, optionally including in its chain either one of —SO—, —COO— and —O— group, or $R_{17}$ represents a radical of the formula:

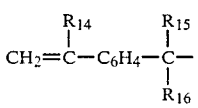

$R_{18}$ represents alkylene having 2 to 12 carbon atoms, optionally substituted with one or more of alkyl groups having 1 to 6 carbon atoms;

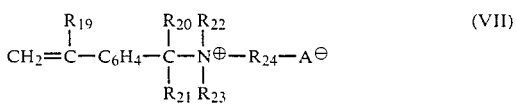
(VII)

wherein $R_{19}$, $R_{20}$ and $R_{21}$ are the same or different and each represents H or $CH_3$, $R_{22}$ represents $C_1$-$C_{20}$ alkyl having at least one hydroxyl group and optionally containing in its alkyl structure a group of —O— or —COO—, $R_{23}$ represents $C_1$-$C_{20}$ alkyl having at least one hydroxyl group and optionally containing in its alkyl structure a group of —O— or —COO—, or H or $C_1$-$C_{20}$ alkyl, $R_{24}$ represents optionally substituted $(CH_2)n$ alkylene in which n is an integer of from 1 to 6, and A is $COO$ or $SO_3$; and

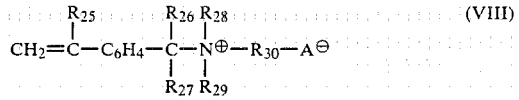

wherein $R_{25}$, $R_{26}$ and $R_{27}$ are the same or different and each represents H or $CH_3$, $R_{28}$ and $R_{29}$ are the same or different and each represents $C_1$-$C_{20}$ alkyl optionally containing —O— or —COO—, or cycloalkyl group, or $R_{28}$ and $R_{29}$ taken together may form a hetero ring containing nitrogen atom, $R_{30}$ represents optionally substituted $(CH_2)n$ alkylene in which n is an integer of from 1 to 6, and A is $COO$ or $SO_3$, and at least one polymerizable monomer selected from hydroxy bearing monomers, carboxyl bearing monomers, glycidyl bearing monomers, alkyl acrylates or methacrylates, N-containing alkyl acrylates or methacrylates, polymerizable amides, polymerizable nitriles, polymerizable aromatic compounds, α-olefins, vinyl compounds and diene compounds already stated hereinbefore. As to the details of the polymerizable amino acid compounds, reference should be made to Japanese Patent Applications of Nippon Paint Co., Ltd., Nos. 123899/78 (Kokai No. 51050/80), 125996/78 (Kokai No. 53251/80), 47651/80 (Kokai No. 145249/81) and 47652/80 (Kokai No. 14250/81), and as to amphoionic radical bearing acrylic resin, to Japanese Patent Application of Nippon Paint Co., Ltd., No. 71864/81 filed on May 12, 1981. Preferably, these acrylic resins should have an acid value of 30 to 180, most preferably 40 to 160, and number average molecular weight of 500 to 10,000, and most preferably 700 to 6,000. Melamine resins having

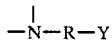

radical may be prepared by using at least one hydroxyl bearing aminosulfonic type amphoionic compound represented by the formula:

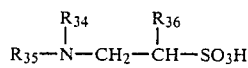

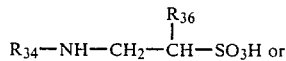

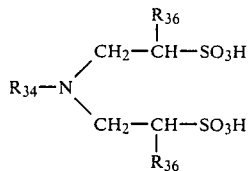

wherein $R_{34}$ represents $C_1$-$C_{20}$ hydroxyalkyl optionally containing in alkyl structure a group of —O— or —COO—, $R_{35}$ has the same meaning with $R_{34}$ or represents lower alkyl, and $R_{36}$ represents H or methyl group, together with melamine and formaline and following the conventional means. The reaction conditions and procedures used are not of a specific nature, and in this connection, reference should be made to, for example, "A Guide to Synthetic Resins for Coating Compositions," by K. Kitaoka, published on May 25, 1974, Kobunshi Kankokai, pages 134 to 139.

The abovesaid hydroxy bearing aminosulfonic type amphoionic compounds are described in more minute detail in Japanese Patent Application by Nippon Paint Co. Ltd., No. 170624/79 (Kokai No. 92859/81). Polyether resin having

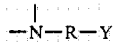

mgroup may be prepared, as stated in Japanese Patent Application No. 116293/80 (Kokai No. 40522/82) filed on Aug. 22, 1980, by Nippon Paint Co., Ltd., by reacting a compound of the formula:

$$R_{33}-NH-A-SO_3M \qquad (XIII)$$

wherein $R_{33}$ is a substituent incapable of reacting with epoxy group, A represents an alkylene or phenylene, and M stands for alkali metal or ammonium group, with a polyether type epoxy resin having at the end of the polymeric chain a group of the formula:

wherein $R_{31}$ and $R_{32}$ each represents hydrogen or methyl group, thereby obtaining a modified polyether type epoxy resin having at the end of polymeric chain a group of the formula:

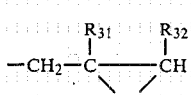

Various polyether type epoxy resins are commercially available.

All of the abovementioned resins do possess in their molecule a characteristic amphoionic group of

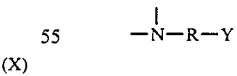

and may be prepared either as a water soluble type or as an organic solvent soluble type. When selecting a water soluble type resin, this is quite useful as emulsifier and dispersing agent in an emulsion polymerization of α,β-ethylenically unsaturated monomers in an aqueous medium and therefore, without using any additional emulsifier, it is possible to prepare microparticles of crosslinked polymer employable in the formation of high solid coating composition. The polymerization may preferably and advantageously be carried out by adding a mixture of defined amounts of each monomer including crosslinking monomer, to an aqueous medium containing the abovesaid amphoionic type resin, in the presence of polymerization initiator. The amount of said amphoionic type resin may vary within a comparatively wide range, and however, in general, it is in the order of 0.3 to 8%, and preferably 0.5 to 6% by weight of the total amount of monomers to be copolymerized. The crosslinking monomer may constitute 0.01 to 20%, most preferably 0.1 to 10% by weight of the total polymerization monomers, and however, this is not critical in the present invention. What is essential is to present the crosslinking monomer in the reaction system in sufficient quantity to make the microparticle polymer insoluble in the combination of film-forming polymer and organic liquid diluent.

The reaction medium, i.e. water, may be used in an amount so as to give a resinous emulsion of 2 to 65%, preferably 20–60%, solid content. In order to assist the solubilization of said amphoionic resin, a quantity of basic material equivalent to the acid value may present in the reaction medium. As the basic materials, use can be made of alkali metal hydroxide, ammonia and organic amines, but for reason of volatile property and giving no residual inorganic ions in the formed coating, preference is given to ammonia or organic amine. The aqueous medium may also contain a water miscible organic solvent, if desired.

As the polymerization initiator, any of the members known to be useful in the related technical fields may satisfactorily be used including organic peroxides as benzoyl peroxide, t-butyl peroxide and cumene hydroperoxide, organic azo-compounds as azobiscyanovaleric acid, azobisisobutyronitrile, azobis-(2,4-dimethyl)-valeronitrile, and azobis-(2-aminopropane) hydrochloride, inorganic water soluble radical initiators as potassium persulfate, ammonium persulfate, sodium persulfate and hydrogen peroxide, and redox type initiators comprising the combination of said inorganic water soluble radical initiator and sodium pyrosulfite, sodium hydrogen sulfite or bivalent Fe ion. They may be used each alone or in combination. Such initiator may be previously contained in the reaction medium or may be added to the reaction system simultaneously with the addition of constituent monomers. The amount of initiator is usually in a range of from 0.05 to 5%, preferably 0.1 to 3%, by weight of the total monomers to be copolymerized. If desired, a normal chain transfer agent as lauryl mercaptan, hexyl mercaptan and the like may be present in an appropriate amount.

By the adoption of said emulsion polymerization technique, a stably dispersed, milky or creamy resinous emulsion can be obtained, the average diameter of contained microparticles being in the range of from 0.02 to 0.5μ. When removing water from the emulsion by, for example, spray drying, solvent replacement, azeotropic distillation, centrifugal separation, filtering, drying and other appropriate means, a somewhat polymeric mass having a maximum diameter of about 40μ can be obtained, which, however, is never a fused mass. Such product is very useful as the microparticles in a high solid coating composition. This is because, α,β-ethylenically unsaturated monomers and crosslinking monomers are successfully copolymerized in the presence of said amphoionic type resin, without the necessity of using any additional emulsifier, microparticles of polymer crosslinked to the extent that they are insoluble in an organic liquid diluent are provided, and the thus formed microparticles are always accompanied, through physical adhesion, by the amphoionic type resin used, which has an excellent affinity to volatile organic liquid diluent to be used in a coating composition. Therefore, when the microparticles are added to the composition of film-forming polymer, crosslinking agent and organic liquid diluent, they can be maintained in a stabilized state of dispersion therein. Besides the above, since the emulsion does not include any harmful surfactant or emulsifier, it may directly be used for the preparation of aqueous coating composition capable of resulting a coating with excellent weather resistance and water resistance.

As previously stated, a resin having an amphoinoic radical of the formula:

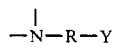

can exhibit specific reactivity and surface activity and hence is quite useful as an emulsifier or dispersing agent in the polymerization of α,β-ethylenically unsaturated monomers in an aqueous or non-aqueous reaction medium. However, the microparticles obtained are composed of crosslinked polymer, on which surfaces the amphoionic type resins are merely held by physical adhesion. Insofar as the amphoionic type resins are anchored by that force, the particles may be maintained in a stabilized state of dispersion in the coating composition, but once the resins flow out of the microparticles for some reason, the stability of the microparticles would be greatly deteriorated.

The inventors have now surprisingly found that by the inclusion of polymerizable α,β-unsaturation bonding in that amphoionic type resin, an additional role of anchoring of the resin to the microparticles can be attained, without sacrificing the desired properties and functioning of said resin.

Thus, in the second aspect of the invention, is provided a resinous emulsion comprising an aqueous medium and microparticles of crosslinked acrylic copolymer stably dispersed therein, the said copolymer having covalently bonded thereto a resinous portion having an amphoionic group of the formula:

Such emulsion may be advantageously prepared by polymerizing at least one α,β ethylenically unsaturated monomer and at least one crosslinking monomer in an aqueous medium in the presence of a resin having an amphoionic radical of the formula:

and a polymerizable α,β-unsaturated bonding.

Examples of such resins are alkyd, polyester, modified epoxy, acrylic, melamine and polyether resins of similar types as already stated hereinbefore. In these resins, it is very easy to make them carry functional groups such as carboxyl or epoxy groups by the selective use of appropriate monomers to be copolymerized. The desired polymerizable α,β-unsaturated bonding may, therefore, be freely introduced in the molecule of such resin, after having carried said amphoionic radical, by the reaction between the carboxyl bearing amphoionic type resin and epoxy bearing unsaturated compond such as glycidyl acrylate or glycidyl methacrylate, or the reaction between the epoxy bearing amphoionic type resin and α,β-unsaturated carboxylic acid such as acrylic acid, methacrylic acid, crotonic acid or the like.

More specifically, to the alkyd or polyester resin having an amphoionic group as already stated hereinbefore, glycidyl acrylate or methacrylate may be reacted with the carboxyl groups still remaining therein, thereby incorporating a desired amount of polymerizable α,β-unsaturated bonding in that resin. To the modified epoxy resin having an amphoionic group as stated hereinbefore, α,β-unsaturated carboxylic acid may be reacted with the remaining epoxy groups.

In the case of acrylic resins, carboxyl or glycidyl bearing monomers may coexist in the reaction system for the preparation of amphoionic type acrylic resin as already stated hereinbefore, and to the thus obtained resin, epoxy bearing unsaturated compounds such as glycidyl acrylate or methacrylate, or α,β-unsaturated carboxylic acids as acrylic acid, methacrylic acid or crotonic acid may be reacted at a later stage.

To the polyether resin having an amphoionic group, acrylic or methacrylic acid may be used for the reaction with the remaining epoxy groups.

The invention however is not limited to the above and any modifications may be freely made in connection with the preparation of such resin having both amphoionic radicals and polymerizable α,β-unsaturated bonding.

The resins can exhibit variegated affinities to aqueous and non-aqueous solvents because of the presence of the characteristic amphoionic group. Hydrophilic properties may be further increased by the inclusion of hydrophilic groups in the resin. Therefore, in the polymerization of α,β-ethylenically unsaturated monomers, they can be used as an effective emulsifying or dispersion stabilizing agent in a system using either an aqueous or non-aqueous reaction medium. However, for operational ease, the invention intends to use an aqueous medium. Furthermore, since they have the characteristic α,β-unsaturated bonding, they themselves can become involved in the copolymerization reaction, thereby resulting in microparticles of crosslinked copolymer of α,β-ethylenically unsaturated monomers, to which an oligosoap having both resinous portion and amphoionic part of the formula:

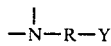

has been firmly anchored via covalent bonding.

Emulsion polymerization per se is very similar to those as already stated hereinbefore.

From the thus obtained emulsion, microparticles may be separated and added to the composition of film-forming polymer, organic liquid diluent and crosslinking agent to obtain a high solid coating composition. The emulsion may also be directly used for the preparation of aqueous coating composition. In either case, since no harmful surfactant or emulsifier are included, the coating will show better water resistance and weather resistance, as is apparent to those skilled in the art.

The invention shall be more fully explained in the following Examples, which however should not be taken as being limitative in any sense. In these Examples, unless otherwise being stated, all parts and % are by weight.

EXAMPLE 1

Preparation of polyeter resin having an amphoionic group:

Into a 2 liter flask fitted with stirrer, nitrogen gas inlet tube, condenser thermoregulator and decanter, were placed 191 parts of hydroxyethyl taurine, 140 parts of ethyleneglycol, 170 parts of triethyleneglycol, 331 parts of adipic acid, 168 parts of phthalic anhydride and 40 parts of xylene, and the mixture was heated, while removing the formed water azeotropically with xylene. The temperature was raised to 190° C. in about 2 hours from the commencement of reflux and stirring and dehydration were continued until the acid value reached less than 10. The thus obtained polyester resin had an acid value of 79, hydroxyl number of 79 and number average molecular weight of 708.

EXAMPLE 2

Preparation of polyester resin having an amphoionic group:

Into a 2 liter flask fitted with stirrer, nitrogen inlet pipe, thermoregulator, condenser and decanter, were placed 134 parts of bishydroxyethyl taurine, 130 parts of neopentylglycol, 236 parts of azelaic acid, 186 parts of phthalic anhydride and 27 parts of xylene, and the mixture was heated, while removing the formed water azeotropically with xylene. The temperature was raised to 190° C. in about 2 hours from the commencement of reflux and stirring and dehydration were continued until the acid value reached to 145. Then the reaction mixture was allowed to cool to 140° C. and while maintaining the same temperature, 314 parts of Cardura E-10 (glycidyl versatate, manufactured by Shell Chem. Co.) were added dropwise in 30 minutes. After stirring for additional 2 hours, the reaction was completed. The thus obtained polyester resin had an acid value of 59, hydroxyl number of 90 and number average molecular weight of 1054.

EXAMPLE 3

Preparation of polyester resin having an amphoionic group:

Into a 2 liter flask fitted with stirrer, nitrogen inlet tube, thermoregulator, condenser and decanter, were placed 85 parts of dehydrated castor oil, 63 parts of coconut oil and 53 parts of trimethylolpropane and the mixture was under a nitrogen stream, heated and stirred at 240° C. for 30 minutes. The methanol tolerance was found to be infinity at this stage. The temperature was then allowed to cool to 150° C., and 725 parts of phthalic anhydride, 343 parts of diethylene glycol, 43 parts of trimethylolpropane, 375 parts of N,N-bis-(2-hydroxyethyl) aminoethane sulfonic acid and 45 parts of xylene were added, while stop stirring, thereto. Stirring was again started, and the temperature was gradually raised, while removing the formed water azeotropically with xylene, to 240° C. in about 2 hours. Stirring and dehydration were continued at the same temperature until the acid value reached 8. The thus obtained polyester resin had an oil length of 10, acid value of 66, hydroxyl number of 100 and number average molecular weight of 800.

EXAMPLE 4

Preparation of modified epoxy resin having an amphoionic group:

Into a 2 liter flask fitted with stirrer, condenser and thermoregulator, were placed 25 parts of taurine, 8 parts of sodium hydroxide, 100 parts of deionized water and 400 parts of ethyleneglycol monoethylether, and the temperature was raised, while keep stirring, to 100° C. At the stage when the mixture turned to a uniform solution, a solution of 190 parts of Epicot 828 (bisphenol A diglycidylether type epoxy resin, epoxy equivalent 190, manufactured by Shell Chem. Co.) and 200 parts of ethyleneglycol monoethylether was dropwise added in 2 hours. After completion of said addition, the mixture was stirred and heated for additional 5 hours. The reaction solution was then acidified with hydrochloric acid and the formed precipitates were separated. This was purified by reprecipitation method with ethyleneglycol monoethylether and water and dried to obtain 205 parts of modified epoxy resin. The acid value (measured by KOH titration) of this resin was 48.6 and sulphur content (measured by fluorescent X ray analysis) was 3%.

EXAMPLE 5

Preparation of modified epoxy resin having an amphoionic group:

Into a similar reaction vessel as used in Example 1, were placed 73.5 parts of sodium salt of taurine, 100 parts of ethyleneglycol and 200 parts of ethyleneglycol monomethylether, and the mixture was stirred and heated to 120° C. to obtain a clear solution. To this, a mixture of 470 parts of Epon 1001 (bisphenol A digycidylether type epoxy resin, epoxy equivalent 470, manufactured by Shell Chem. Co.) and 400 parts of ethyleneglycol monomethylether was added dropwise over 2 hours and stirring and heating were continued for 20 hours to complete the reaction. After purifying and drying the product, 518 parts of modified epoxy resin were obtained, whose acid value was 49.4 and sulfur content (fluorescent X ray analysis) was 2.8%.

EXAMPLE 6

Preparation of modified epoxy resin having an amphoionic group:

Into a reaction vessel as used in Example 1, were placed 121 parts of sodium salt of N-methyltaurine, 100 parts of ethyleneglycol and 200 parts of ethylene glycol monomethylether, and the mixture was heated, while stirring, to 120° C. to obtain a clear solution. To this, a mixture of 475 parts of Epon 1004 (bisphenol A diglycidylether type epoxy resin, epoxy equivalent 950, manufactured by Shell Chem. Co.) and 400 parts of ethyleneglycol monomethylether was added dropwise over 2 hours and stirring and heating were continued for 20 hours to complete the reaction. The reaction product was purified and dried as in Example 4 to obtain 540 parts of modified epoxy resin. The acid value was 50 and sulfur content (fluorescent X ray analysis) was 2.9%.

EXAMPLE 7

Preparation of acrylic resin having an amphoionic group:

Into a similar reaction vessel as used in Example 1, were placed 100 parts of ethyleneglycol monomethylether and the temperature was raised to 100° C. and maintained the same temperature. Two dropping funnels were provided. In one funnel, were placed 100 parts of ethyleneglycol monomethylether and 75 parts of N-methyl-N-(vinylbenzyl) taurine were dissolved therein, together with a small amount of dimethylethanolamine (as solubilizing assistant). Into the other funnel, were placed 50 parts of 2-hydroxyethyl acrylate, 10 parts of acylic acid, 110 parts of methyl methacrylate, 110 parts of styrene, 145 parts of n-butyl acrylate and 10 parts of lauryl mercaptan and to this mixture, were dissolved 10 parts of azobisisobutyronitrile.

The contents of these two funnels were added dropwise and simultaneously to the abovesaid reactor in 120 minutes and thereafter, while keeping the temperature at 100° C. stirring was continued for 60 minutes. Next, the solvent was removed by rotary evaporator to obtain acrylic resin having a solid content of 96%. Number average molecular weight of the thus obtained resin was found to be 4500.

EXAMPLE 8

Preparation of an acrylic resin having an amphoionic group:

Following the procedures of Example 7, was obtained a resinous solution of the undermentioned composition:

| | |
|---|---|
| N,N—dimethyl-N—(vinylbenzyl)-ammonio betain acetate | 100 parts |
| 2-hydroxyethyl acrylate | 60 parts |
| acrylic acid | 25 parts |
| methyl methacrylate | 80 parts |
| styrene | 80 parts |
| n-butyl acrylate | 165 parts |
| lauryl mercaptan | 15 parts |
| azobisisobutyronitrile | 10 parts |
| ethyleneglycol monomethylether | 200 parts |

The solvent was removed by using rotary evaporator, to obtain an acrylic resin having a solid content of 97%, number average molecular weight of the resin being 3900.

EXAMPLE 9

Into a 1 liter reaction vessel fitted with stirrer, condenser and thermoregulator, were placed 306 parts of deionized water, 30 parts of the polyester resin obtained in Example 1 and 3 parts of dimethylethanolamine, and the mixture was stirred and heated at 80° C. to obtain a clear solution. To this, were added 4.5 parts of azobiscyanovaleric acid dissolved in a combined solution of 45 parts of deionized water and 4.3 parts of dimethylethanolamine, and then dropwise a mixture of 70.7 parts of methyl methacrylate, 94.2 parts of n-butyl acrylate, 70.7 parts of styrene, 30 parts of 2-hydroxyethyl acrylate and 4.5 parts of ethyleneglycol dimethacrylate in 60 minutes. After completion of said addition, a further 1.5 parts of azobiscyanovaleric acid dissolved in a combined solution of 15 parts of deionized water and 1.4 parts of dimethylethanolamine was added and the mixture was stirred at 80° C. for 60 minutes to obtain an emulsion having a solid content 45%, pH 7.4, viscosity 78 cps (25° C.) and particle diameter 0.138 $\mu$(light scattering method, hereinunder the same), which was 0.052$\mu$ when measured by electron microscope.

When the emulsion was filtered by a 400 mesh metal sieve, it was found that impassable agglomerate was only 0.3% of the formed emulsion. The emulsion was also found to be excellent in mechanical stability and storage stability. No agglomerates or precipitations were observed even when stored at room temperature for 3 months.

EXAMPLE 10

Similar procedures set forth in Example 9 were repeated excepting substituting 10 parts of polyester resin obtained in Example 2 and 0.75 part of dimethyl ethanolamine for 30 parts of the polyester resin obtained in Example 1 and 3 parts of dimethylethanolamine, to obtain an emulsion having a non-volatile content 45%, pH 7.2, viscosity 92 cps (25° C.) and particle diameter 0.156µ (0.102µ by electron microscope method). When filtered by a 400 mesh metal sieve, impassable agglomerate was 0.2%. This emulsion was found to be excellent in mechanical stability.

EXAMPLE 11

Into a similar reaction vessel as used in Example 9, were placed 306 parts of deionized water, 20 parts of the polyester resin obtained in Example 3 and 1.8 parts of triethylamine and the mixture was stirred and heated at 75° C. to obtain a clear solution. To this, were added 4.5 parts of azobiscyanovaleric acid dissolved in a combined solution of 45 parts of deionized water and 4.9 parts of triethylamine and then dropwise a mixture of 150 parts of of methyl methacrylate, 127 parts of n-butyl acrylate and 3 parts of divinylbenzene in 90 minutes. After completion of said addition, a further 1.5 parts of azobiscyanovaleric acid dissolved in a combined solution of 15 parts of deionized water and 1.6 parts of triethylamine was added and the mixture was stirred at 80° C. for 60 minutes to obtain an emulsion having a solid content 45%, pH 7.2, viscosity 84 cps (25° C.) and particle diameter 0.158µ (0.070µ by electron microscope method). When filtered by a 400 mesh metal sieve, impassable agglomerate was 0.2%. Mechanical stability was excellent.

EXAMPLES 12–17

Various emulsions (No. 4–9) were prepared according to the method of Example 9 with the materials shown in Table 1. The properties and impassable agglomerates through 400 mesh metal sieve of the respective emulsion were also given in Table 1.

TABLE 1

| Ex. | polyester | deion. water | DMEA | MMA | n-BA | ST | 2-HEA | AA | LM | EGDM | DVB | add. time |
|---|---|---|---|---|---|---|---|---|---|---|---|---|
| 12 | Ex. 2 (30) | 306 | 3.0 | 68.4 | 91.2 | 68.4 | 30 | — | — | 12 | — | 60 min. |
| 13 | Ex. 2 (27) | 306 | 1.0 | 53.2 | 70.9 | 53.2 | 30 | — | — | 30 | — | 60 |
| 14 | Ex. 2 (60) | 306 | 6.0 | 107.9 | 144 | 107.9 | 30 | — | 3 | — | 0.2 | 120 |
| 15 | Ex. 3 (10) | 306 | 3.0 | 75.3 | 100.4 | 75.3 | 30 | 3 | — | 6 | — | 60 |
| 16 | Ex. 1 (20) | 306 | 2 | | | (2) | | | | | | 60 |
| 17 | Ex. 1 (15) | 306 | 1.5 | | | | | | | | | 90 |

| Ex. | NV % | pH | visc.[1] | diam.[2] | diam.[3] | 400 mesh impass. % | mech. stab. |
|---|---|---|---|---|---|---|---|
| 12 | 45 | 7.4 | 58 | 0.138 | 0.058 | 0.2 | good |
| 13 | 40 | 7.2 | 38 | 0.220 | 0.116 | 1.4 | good |
| 14 | 55 | 7.2 | 152 | 0.112 | 0.038 | 0.1 | good |
| 15 | 45 | 7.5 | 70 | 0.136 | 0.096 | 0.2 | good |
| 16 | 45 | 7.2 | 68 | 0.120 | 0.080 | 0.3 | good |
| 17 | 45 | 7.2 | 56 | 0.145 | 0.083 | 0.3 | good |

Note (1)
DMEA: dimethylethanolamine,
2-HEA: 2-hydroxyethyl acrylate,
MMA: methyl methacrylate,
ST: styrene,
n-BA: n-butyl acrylate,
LM: dodecyl mercaptan,
EGDM: ethyleneglycol dimethacrylate, and
DVB: divinylbenzene
visc.[1] viscosity (25° C.) cps
diam.[2] diameter by light scattering method, µ
diam.[3] diameter by electron microscope method, µ
Note (2)
Compositions of Examples 16 and 17 are as follows:

| Ex. | MMA | n-BMA | ST | n-BA | 2-EHA | LMA | 2-HEA | 2-HEMA | EGDM | DVB |
|---|---|---|---|---|---|---|---|---|---|---|
| 16 | — | 50 | — | 61.5 | 80 | 60 | 24 | — | 4.5 | — |
| 17 | 100.8 | — | 100.8 | 50.4 | — | — | — | 30 | — | 3 | wherein 2-HEMA is 2-hydroxyethyl methacrylate, n-BMA is n-butyl methacrylate, 2-EHA is 2-ethylhexyl acrylate and LMA is dodecyl methacrylate.

EXAMPLE 18

Into a similar reaction vessel as used in Example 9, were placed 408 parts of deionized water and 4 parts of dimethylethanolamine and while stirring and maintaining the temperature at 80° C., 6.4 parts of azobiscyanovaleric acid dissolved in a combined solution of 64 parts of deionized water and 6.1 parts of dimethylethanolamine were added. To this, a mixture of 94.8 parts of methylmethacrylate, 126.4 parts of n-butyl acrylate, 94.8 parts of styrene, 40 parts of 2-hydroxy acrylate, 4 parts of ethyleneglycol dimethacrylate and 40 parts of the polyester resin obtained in example 2 was added dropwise in 60 minutes. After completion of said addition, 1.6 parts of azobiscyanovaleric acid dissolved in a combined solution of 16 parts of deionized water and 1.5 parts of dimethyl ethanolamine was added and the mixture was stirred at 80° C. for 60 minutes to obtain an emulsion having a solid content 45%, pH 7.2, viscosity 96 cps (25° C.) and particle diameter 0.168μ (0.055μ by electron microscope method). When filtered through a 400 mesh metal sieve, there remained only 0.1% impassable agglomerates. The mechanical stability was excellent.

EXAMPLE 19

Into a 1 liter reaction vessel fitted with stirrer, condenser and thermoregulator, were placed 306 parts of deionized water, 7.5 parts of modified epoxy resin obtained in Example 4 and 1.0 part of dimethylethanolamine and the mixture was stirred and heated to 80° C. to obtain a clear solution. While maintaining the same temperature under stirring, an aqueous solution of 4.8 parts of azobiscyanovaleric acid, 4.56 parts of dimethylethanoamine and 48 parts of deionized water was added and then a mixed solution of 80 parts of styrene, 80 parts of methyl methacrylate, 107 parts of n-butyl acrylate, 30 parts of 2-hydroxyethyl acrylate and 3 parts of ethyleneglycol dimethacrylate was dropwise added in 60 minutes. After completion of said addition, a further 1.2 parts of azobiscyanovaleric acid dissolved in a combined solution of 1.14 parts of dimethylethanolamine and 12 parts of deionized water was added and the mixture was stirred for 60 minutes to obtain an emulsion having a solid content 47%, pH 7.2, viscosity 76 cps (25° C.) and particle diameter 0.112μ (0.041 μ by electron microscope method). When filtered through a 400 mesh metal sieve, impassable agglomerates were only 0.2%. The emulsion also showed excellent mechanical stability.

EXAMPLE 21

Into a reaction vessel as used in Example 9, were placed 306 parts of deionized water, 45 parts of modified epoxy resin obtained in example 6 and 3.6 parts of dimethylethanolamine and the mixture was heated, while stirring, to 80° C. to obtain a clear solution. While maintaining the same temperature under stirring, a mixed solution of 4.8 parts of azobiscyanovaleric acid, 4.56 parts of dimethanolamine and 48 parts of deionized water was added and then a mixture of 67 parts of styrene, 67 parts of methyl methacrylate, 89.5 parts of n-butyl acrylate, 30 parts of 2-hydroxyethyl acrylate and 1.5 parts of ethyleneglycol dimethacrylate was added dropwise in 150 minutes. After completion of said addition, a further 1.2 parts of azobiscyanovaleric acid dissolved in a mixed solution of 1.14 parts of dimethylethanolamine and 12 parts of deionized water were added and the thus obtained mixture was stirred for 60 minutes to obtain an emulsion having a solid content 45%, pH 7.2, viscosity 72 cps (25° C.) and particle diameter 0.120μ (0.032μ by electron microscope method). When filtered through a 400 mesh metal sieve, impassable agglomerates were only 0.1%. Mechanical stability was also excellent.

EXAMPLES 22–29

Various emulsions (No. 14–21) were prepared following the procedures of Examples 19 but using the materials showin in Table 2. The properties and impassable agglomerates through a 400 mesh metal sieve of the respective emulsion were also shown in Table 2.

TABLE 2

| Ex. | mod. epoxy | deion. water | DMEA | MMA | n-BA | ST | 2-HEA | AA | LM | EGDM | DVB | add. time |
|---|---|---|---|---|---|---|---|---|---|---|---|---|
| 22 | Ex. 4 (150) | 306 | 9.1 | 37.7 | 50.3 | 37.7 | 30 | — | — | 0.3 | — | 120 min. |
| 23 | Ex. 4 (80) | 306 | 3.8 | 36.7 | 49.0 | 36.7 | 30 | 6 | — | 1.2 | — | 90 |
| 24 | Ex. 4 (10) | 306 | 1.26 | 49.3 | 65.8 | 49.3 | 30 | — | 1 | 45 | — | 60 |
| 25 | Ex. 5 (45) | 306 | 6 | 48.3 | 29.4 | 48.3 | 30 | — | — | — | 3 | 90 |
| 26 | Ex. 5 (5) | 306 | 0.10 | 103.5 | 138.0 | 103.5 | 15 | 3 | — | 6 | — | 60 |
| 27 | Ex. 6 (12) | 306 | 2.6 | 57.1 | 76.2 | 57.1 | 30 | — | — | 18 | — | 60 |
| 28 | Ex. 4 (15) | 306 | 1.7 | | | | (3) | | | | | 60 |
| 29 | Ex. 4 (45) | 306 | 5.1 | | | | | | | | | 90 |

| | | Properties | | | 400 mesh | mech. |
|---|---|---|---|---|---|---|
| Ex. | NV % | pH | visc.[1] | diam.[2] | diam.[3] | impass. % | stab. |
| 22 | 50 | 7.2 | 850 | 0.102 | 0.026 | 0.1 | good |
| 23 | 45 | 6.5 | 296 | 0.108 | 0.034 | 0.9 | good |
| 24 | 45 | 7.4 | 88 | 0.142 | 0.056 | 0.1 | good |
| 25 | 40 | 7.2 | 76 | 0.128 | 0.047 | 0.1 | good |
| 26 | 55 | 6.8 | 50 | 0.186 | 0.076 | 0.5 | good |
| 27 | 45 | 7.5 | 90 | 0.162 | 0.057 | 0.5 | good |
| 28 | 45 | 7.2 | 98 | 0.142 | 0.050 | 0.2 | good |
| 29 | 45 | 7.2 | 630 | 0.120 | 0.045 | 0.4 | good |

Note (3)
Compositions of Examples 28 and 29 are as follows:

| | composition (parts) | | | | | | | | | |
|---|---|---|---|---|---|---|---|---|---|---|
| Ex. | MMA | n-BMA | ST | n-BA | 2-EHA | LMA | 2-HEA | 2-HEMA | EGDM | DVB |
| 28 | — | 50 | — | 68 | 80 | 60 | 21 | — | 6 | — |
| 29 | 88.6 | — | 88.6 | 54.3 | — | — | 30 | — | — | 3.6 | wherein 2-HEMA is 2-hydroxyethyl methacrylate, n-BMA is n-butyl methacrylate, 2-EHA is 2-ethylhexyl acrylate and LMA is dodecyl methacrylate.

EXAMPLE 30

Into a 1 liter reaction vessel fitted with stirrer, condenser and theromoregulator, were placed 306 parts of deionized water and 18 parts of acrylic resin obtained in Example 7 and 2.6 parts of dimethylethanolamine and the mixture was heated while stirring to 80° C. to obtain a clear solution. While maintaining the temperature at 80° C. and stirring, 4.8 parts of azobiscyanovaleric acid dissolved in a combined solution of 48 parts of deionized water and 4.56 parts of dimethyl ethanolamine were added. To this, a mixture of 74.7 parts of styrene, 74.7 parts of methy methacrylate, 99.6 parts of n-butyl acrylate, 30 parts of 2-hydroxyethyl acrylate, and 3 parts of ethyleneglycol dimethacrylate was added dropwise in 60 minutes. After completion of said addition, 1.2 parts of azobiscyanovaleric acid dissolved in combined solution of 12 parts of deionized water and 1.14 parts of dimethylethanolamine was added and the mixture was stirred for 60 minutes to obtain an emulsion having a solid content 45%, pH 7.4, viscosity 92 cps (25° C.) and particle diameter 0.132μ (0.090μ by electron microscope method). When filtered through a 400 mesh metal sieve, there remained only 0.6% impassable agglomerates. The mechanical stability was excellent.

EXAMPLES 31–34

Various emulsions (No. 23–26) were prepared following the procedures of Example 30, but using the materials shown in Table 3. The properties and impassable agglomerates through a 400 mesh metal sieve of the respective emulsion were also given in Table 3.

same temperature, in 30 minutes and thereafter, stirring was continued for about 2 hours. The reaction mixture was then cooled to 80° C., added with 0.05 part of hydroquinone monomethyl ether, 140 parts of xylene, 170 parts of glycidyl methacrylate and 7.5 parts of triethylamine, and reacted at 90° C. for 3 hours. Thus obtained resin had an acid value of 53, hydroxyl number of 73, number average molecular weight of 1110 and sulfur value of 21.9.

(b) Preparation of resinous emulsion:

Into a reaction vessel equipped with stirrer, condenser and thermoregulator, were placed 25 parts of polyester resin obtained in the peceding paragraph (a), 1.7 parts of dimethylethanolamine and 508 parts of deionized water, and the mixture was heated, while stirring, to 80° C. To this, 90 parts of the following initiator solution were added and immediately thereafter, dropwise addition of the following monomer mixture was started.

| Initiator solution | |
|---|---|
| azobiscyanovaleric acid | 10 parts |
| deionized water | 100 parts |
| dimethylethanolamine | 10 parts |
| Monomer mixture | |
| methyl methacrylate | 125 parts |
| n-butyl acrylate | 165 parts |
| styrene | 125 parts |
| 2-hydroxyethyl acrylate | 50 parts |
| ethyleneglycol dimethacrylate | 10 parts |

After finishing said addition in 60 minutes, the re-

TABLE 3

| Ex. | acryl res. | deion. water | DMEA | MMA | n-BA | n-BMA | ST | 2-EHA | 2-HEA | AA | LM | EGDM | DVB | addition time. (min) |
|---|---|---|---|---|---|---|---|---|---|---|---|---|---|---|
| 31 | Ex. 1 (30) | 306 | 4.2 | — | 38 | 50 | 63 | 80 | 30 | — | — | 9 | — | 90 |
| 32 | Ex. 1 (9) | 306 | 1.3 | 76 | 101.5 | — | 76 | — | 30 | 6 | — | — | 1.5 | 60 |
| 33 | Ex. 1 (60) | 306 | 8.4 | 79.2 | 39.6 | — | 79.2 | — | 24 | — | 3 | 18 | — | 120 |
| 34 | Ex. 2 (30) | 306 | 3.8 | 70.7 | 94.1 | — | 70.7 | — | 30 | — | — | 4.5 | — | 90 |

| Ex. | NV content % | pH | visc.[1] | Properties diam.[2] | diam.[3] | impass agglom. % | mechical stability |
|---|---|---|---|---|---|---|---|
| 31 | 45 | 7.2 | 96 | 0.172 | 0.085 | 0.4 | good |
| 32 | 45 | 7.5 | 98 | 0.246 | 0.130 | 1.6 | good |
| 33 | 45 | 7.2 | 129 | 0.152 | 0.041 | 0.4 | good |
| 34 | 45 | 7.4 | 108 | 0.168 | 0.055 | 0.6 | good |

EXAMPLE 35

(a) Preparation of polyester resin having both amphoionic group and polymerizable α,β-unsaturated bonding:

Into a 2 liter flask equipped with stirrer, nitrogen inlet pipe, thermoregulator, condenser and decanter, were placed 213 parts of bishydroxyethyl taurine, 236 parts of 1,6-hexanediol, 296 parts of phthalic anhydride, 376 parts of azelaic acid and 44 parts of xylene, and the mixture was heated, while removing the formed water azeotropically with xylene. The temperature reached 210° C. in about 3 hours from the commencement of reflux and the reaction was continued under stirring and dehydration until the acid value reached to 125. After cooling to 140° C., 250 parts of Cardura E-10 (glycidyl ester of versatic acid, manufactured by Shell Chem. Co.) were dropwisely added, while maintaining the maining 30 parts of said initiator solution were added and stirring was continued for additional 30 minutes. Thus obtained emulsion contained microgel dispersed phase, an average diameter (measured by transmission type electron microscope) of which was 0.083μ.

EXAMPLE 36

Into the same reaction vessel as stated in Example 35, were placed 100 parts of polyester resin obtained in paragraph (a) of Example 35, 68 parts of dimethylethanolamine and 503 parts of deionized water, and the mixture was heated, while stirring, to 80° C. To this, 72 parts of the following initiator solution were added and immediately thereafter dropwise addition of the following monomer mixture was started.

| Initiator solution | |
|---|---|
| azobiscyanovaleric acid | 8 parts |
| deionized water | 80 parts |
| dimethylethanolamine | 8 parts |
| Monomer mixture | |
| methyl methacrylate | 80 parts |
| n-butyl acrylate | 130 parts |
| styrene | 80 parts |
| 2-hydroxyethyl acrylate | 50 parts |
| glycidyl methacrylate | 18.5 parts |
| methacrylic acid | 11.5 parts |

After completion of said addition in 2 hours, the remaining 24 parts of the initiator solution were added and the reaction was continued for 30 minutes under stirring. The thus obtained emulsion contained a microgel dispersed phase, an average diameter of which was 0.042μ.

EXAMPLE 37 AND COMPARATIVE EXAMPLE 1

This example demonstrates the use of microparticles separated from the present emulsion in a high solid coating composition.

Into a stainless steel vessel, were weighed the following and the contents were mixed well by using a laboratory mixer to obtain a coating composition.

| component | Example 37 | Comp. Exam. 1 |
|---|---|---|
| polymer microparticles of Example 5* | 5 parts | — |
| acrylic resinous varnish** | 500 parts | 500 parts |
| n-butanol modified melamine resin | 65 parts | 65 parts |

*Microparticles were obtained by subjecting the emulsion of Example 5 to a spray drying
**acrylic resinous varnish was prepared according to normal procedure by using 12 parts of methacrylic acid, 264 parts of styrene, 264 parts of methyl methacrylate, 360 parts of n-butyl acrylate and 100 parts of 2-hydroxyethyl acrylate, with 13 parts of azobisisobutyronitrile in toluene (810 parts) and n-butanol (200 parts), the solid content being 50%

When diluted with xylene/ethylene glycol monobutyl ether=1/1 to a Ford cup No. 4 viscosity of 25 seconds, the non-volatile (solid) content of the composition of Example 37 was 39.6%, whereas the corresponding value of Comparative Exam. 1 was 37.6%. In the present coating composition, the sagging property in spray coating was greatly improved as compared with that of the Comparative composition.

EXAMPLE 38

This example demonstrates the use of present emulsion in an aqueous coating composition.

To 200 parts of the emulsion obtained in Example 3, an aminoplast resinous solution obtained by dissolving 23 parts of hexamethoxymelamine (Cymel 303, manufactured by American Cyanamide Co.) in a mixed solution of 14 parts of ethyleneglycol monobutylether and 14 parts of deionized water was gradually added while stirring with laboratory mixer, and then pH was adjusted to 8.3 with dimethylaminoethanol to obtain a thermosetting coating composition. The composition was applied onto 0.8 mm Bonde 144 treated D steel plate (Nippon Test Panel) so as to give a dry thickness of 20 μ and after setting for 10 mints, the test panels were subjected to baking for 30 minutes at each different temperatures of 120° C., 140° C. and 160° C., respectively. In either case, a smooth and clear coating was obtained. When the coatings were immersed in hot water (100° C.) for 1 hour, they showed the following solubility % and swelling %: 6.8% and 30.2% for the coating baked at 120° C.; 1.8% and 15.2% for the coating baked at 140° C.; 0.5% and 6.2% for the coating baked at 160° C.

What is claimed is:

1. In a resinous emulsion comprising a dispersion medium of water and a dispersed phase of polymer microparticles having an average diameter of 0.02 to 0.5μ which are insoluble in water and are maintained in a stabilized state of dispersion therein, the improvement wherein the microparticles are composed of a crosslinked copolymer comprising α,β-ethylenically unsaturated monomers and a crosslinking monomer which is at least difunctional, said copolymer having physically adhered or covalently bonded thereto a resinous portion having an amphoionic group of the formula:

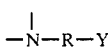

wherein R is a member selected from substituted or unsubstituted alkylene having 1 to 6 carbon atoms and phenylene and Y is —COOH or —SO$_3$H, said resinous portion being selected from the group consisting of modified epoxy, acrylic, polyester and melamine resins.

2. A method for preparing a resinous emulsion comprising a dispersion medium of water and a dispersed phase of polymer microparticles having an average diameter of 0.02 to 0.5μ which are insoluble in water and are maintained in a stabilized state of dispersion therein, microparticles being composed of a crosslinked copolymer comprising α,β-ethylenically unsaturated monomers and a crosslinking monomer which is at least difunctional, and having physically adhered thereto a resinous portion having an amphoionic group of the formula:

wherein R is a member selected from substituted or unsubstituted alkylene having 1 to 6 carbon atoms and phenylene and Y is —COOH or —SO$_3$H, said resinous portion being selected from the group consisting of modified epoxy, acrylic, polyester and melamine resins, which is characterized by that the α,β-ethylenically unsaturated monomers and the crosslinking monomer are copolymerized in an aqueous medium, by emulsion polymerization technique, in the presence of a resin having an amphoionic group of the formula:

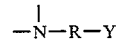

(in which R and Y are as defined above) selected from modified epoxy, acrylic, polyester or melamine resin.

3. A method for preparing a resinous emulsion comprising a dispersion medium of water and a dispersed phase of polymer microparticles having an average diameter of 0.02 to 0.5μ which are insoluble in water and are maintained in a stabilized state of dispersion therein, microparticles being composed of a crosslinked copolymer comprising α,β-ethylenically unsaturated monomers and a crosslinking monomer which is at least difunctional, and having covalently bonded thereto a resinous portion having an amphoionic group of the formula:

$$-\overset{|}{N}-R-Y$$

wherein R is a member selected from substituted or unsubstituted alkylene having 1 to 6 carbon atoms and phenylene and Y is —COOH or —SO$_3$H, said resinous portion being selected from the group consisting of modified epoxy, acrylic, polyester and melamine resins, which is characterized by that the α,β-ethylenically unsaturated monomers and the crosslinking monomer are copolymerized in an aqueous medium, by emulsion polymerization technique, in the presence of a resin having an amphoionic group of the formula:

$$-\overset{|}{N}-R-Y$$

(in which R and Y are as defined above) and a polymerizable α,β-unsaturation bonding, selected from modified epoxy, acrylic, polyester or melamine resin.

* * * * *